(12) United States Patent
Kimura

(10) Patent No.: US 9,323,933 B2
(45) Date of Patent: Apr. 26, 2016

(54) APPARATUS AND METHOD FOR SELECTING AND BOOTING AN OPERATING SYSTEM BASED ON PATH INFORMATION

(71) Applicant: FUJITSU LIMITED, Kawasaki-shi, Kanagawa (JP)

(72) Inventor: Teruhiko Kimura, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 294 days.

(21) Appl. No.: 13/974,647

(22) Filed: Aug. 23, 2013

(65) Prior Publication Data
US 2013/0346738 A1 Dec. 26, 2013

Related U.S. Application Data

(63) Continuation of application No. PCT/JP2011/001659, filed on Mar. 18, 2011.

(51) Int. Cl.
*G06F 9/00* (2006.01)
*G06F 9/24* (2006.01)
*G06F 11/00* (2006.01)
(Continued)

(52) U.S. Cl.
CPC ............ *G06F 21/575* (2013.01); *G06F 9/4401* (2013.01); *G06F 9/4406* (2013.01); *G06F 11/1417* (2013.01); *G06F 11/1469* (2013.01); *G06F 21/00* (2013.01); *G06F 21/572* (2013.01); *G06F 21/60* (2013.01)

(58) Field of Classification Search
CPC ..... G06F 9/4401; G06F 21/60; G06F 21/575; G06F 9/4406; G06F 11/1417; G06F 11/1469; G06F 21/00; G06F 21/572

USPC .......................... 713/1, 2; 714/19, 36; 726/26
See application file for complete search history.

(56) References Cited

U.S. PATENT DOCUMENTS

| 7,769,990 B1 * | 8/2010 | Okcu et al. .......................... 713/1 |
| 2004/0158698 A1 * | 8/2004 | Rothman et al. .................. 713/1 |

(Continued)

FOREIGN PATENT DOCUMENTS

| JP | 10-333902 A | 12/1998 |
| JP | 2001-100990 A | 4/2001 |

(Continued)

OTHER PUBLICATIONS

International Search Report dated Apr. 26, 2011 in application No. PCT/JP2011/001659.

*Primary Examiner* — Ji H Bae
(74) *Attorney, Agent, or Firm* — Maschoff Brennan

(57) ABSTRACT

An information processing apparatus includes a first storage storing an operating system program, a second storage including a boot program storage area, a first area and a second area, and a processor coupled to the first storage and the second storage. The processor writes the first path information, which is stored in the first area and used to boot up the operating system program, into the second area, upon first booting-up, compares the first path information in the first area and the second path information in the second area upon second booting-up subsequent to the first booting-up, determines whether the operating system program indicated by the first path information is to be booted up based on a result of the comparing, and writes the second path information into the first area when the operating system program indicated by the first path information is not to be booted up.

6 Claims, 7 Drawing Sheets

(51) Int. Cl.
*G06F 7/04* (2006.01)
*G06F 21/57* (2013.01)
*G06F 11/14* (2006.01)
*G06F 9/44* (2006.01)
*G06F 21/00* (2013.01)
*G06F 21/60* (2013.01)

(56) References Cited

U.S. PATENT DOCUMENTS

2007/0180509 A1* 8/2007 Swartz et al. ............... 726/9
2008/0301424 A1* 12/2008 Barajas et al. ............... 713/2
2009/0327741 A1 12/2009 Zimmer et al.
2010/0332813 A1* 12/2010 Rothman et al. ............. 713/2
2011/0087872 A1* 4/2011 Shah et al. .................. 713/2
2011/0238969 A1* 9/2011 Warkentin et al. ........... 713/2

FOREIGN PATENT DOCUMENTS

| JP | 2002-023875 A | 1/2002 |
| JP | 2004-234263 A | 8/2004 |
| JP | 2009-205241 A | 9/2009 |
| JP | 2010-073193 A | 4/2010 |

* cited by examiner

WINDOWS.B.C.D.O.
B.J.E.C.T.=.{.9.
d.e.a.8.6.2.c.-.
5.c.d.d.-.4.e.7.
0.-.a.c.c.1.-.f.
3.2.b.3.4.4.d.4.
7.9.5.}.

57 49 4E 44 4F 57 53 00 42 00 43 00 44 00 4F 00
42 00 4A 00 45 00 43 00 54 00 3D 00 7B 00 39 00
64 00 65 00 61 00 38 00 36 00 32 00 63 00 2D 00
35 00 63 00 64 00 64 00 2D 00 34 00 65 00 37 00
30 00 2D 00 61 00 63 00 63 00 31 00 2D 00 66 00
33 00 32 00 62 00 33 00 34 00 34 00 64 00 34 00
37 00 39 00 35 00

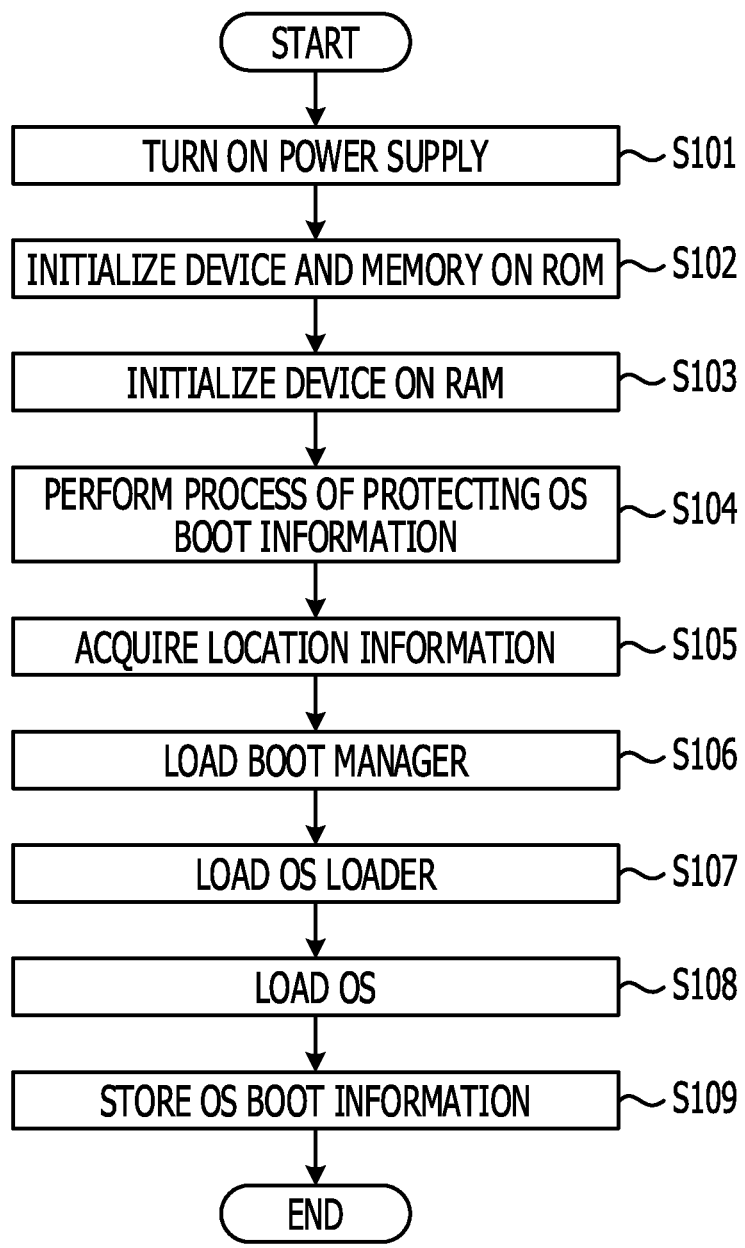

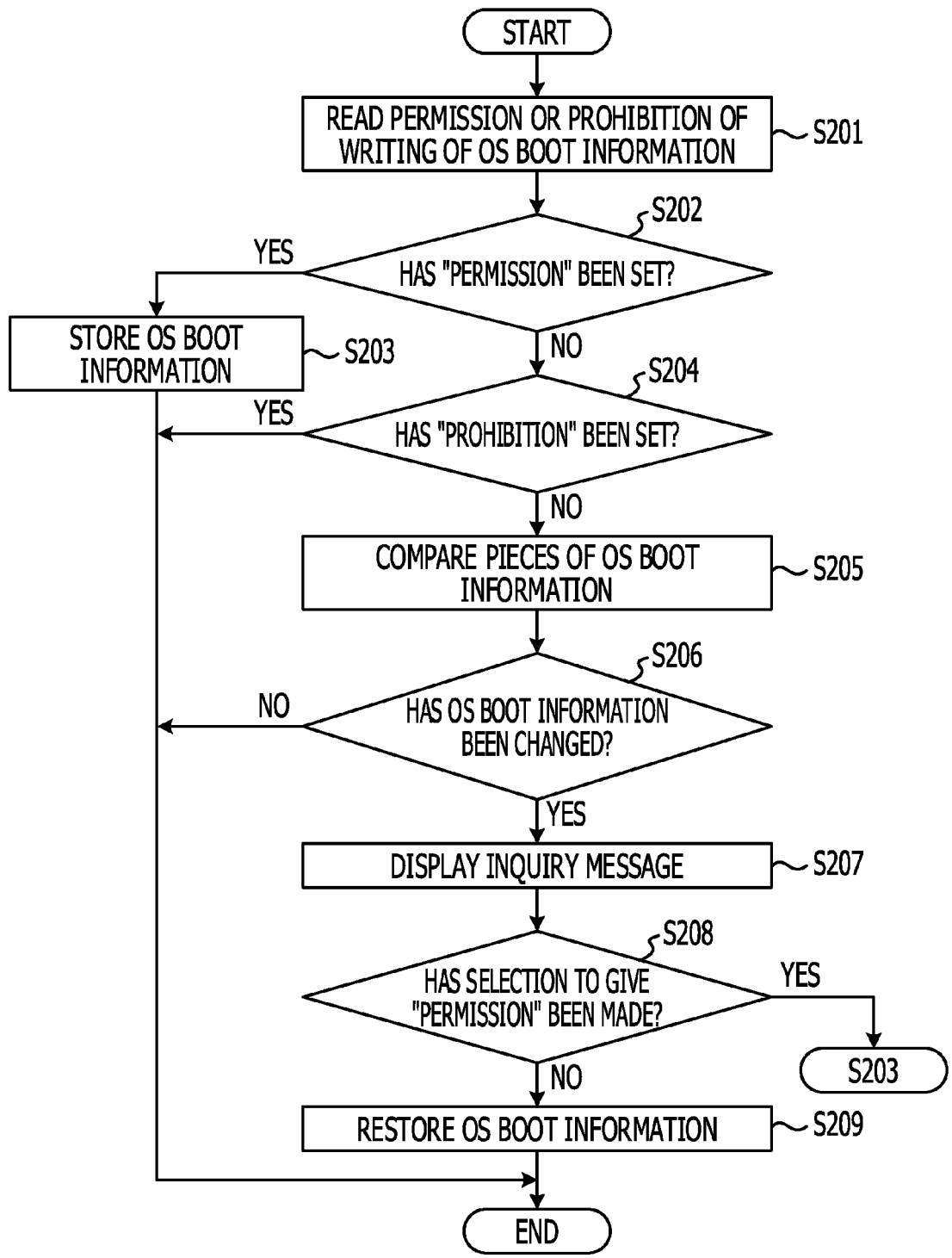

APPARATUS AND METHOD FOR SELECTING AND BOOTING AN OPERATING SYSTEM BASED ON PATH INFORMATION

CROSS-REFERENCE TO RELATED APPLICATION

This application is a continuation application of International Application PCT/JP2011/001659 filed on Mar. 18, 2011 and designated the U.S., the entire contents of which are incorporated herein by reference.

FIELD

The embodiment discussed herein is related to an information processing apparatus and a control method for the information processing apparatus.

BACKGROUND

In an existing information processing apparatus having a basic input/output system (BIOS) program, after the power supply of the information processing apparatus is turned on, first, a central processing unit (CPU) executes a BIOS stored in a read-only memory (ROM) by using the ROM. The CPU initializes a device and a random access memory (RAM) by using the BIOS. Subsequently, the CPU executes the BIOS, thereby loads a BIOS program from the ROM into the memory (RAM), and performs a determination process for an auxiliary storage device used to boot an OS, for example, an initialization process of a device. Furthermore, by executing the BIOS program, the CPU thereby loads, into the memory, a bootstrap loader written in an MBR (master boot record) of the auxiliary storage device that boots up the OS. By executing the bootstrap loader program, the CPU thereby refers to partition information written in the MBR, loads a boot sector from a partition in which a boot flag is set, and proceeds to processing. By executing the BIOS, the CPU thereby loads an OS loader into the memory by using a program in the boot sector. Then, by executing the OS loader, the CPU thereby boots up the OS. Anti-virus software executed on the OS protects the MBR and a boot block, thereby blocking tampering by virus software.

In recent years, as opposed to this BIOS, a Unified Extensible Firmware Interface (UEFI) to which new functionality is added has been used. With UEFI, after a system boots up by turning on a power supply, a CPU executes the UEFI stored in a ROM by using the ROM. By executing the UEFI, the CPU thereby initializes a device and a memory, then loads a UEFI program from the ROM into the memory (RAM), and performs a process for booting up of an OS, for example, an initialization process for the device. By executing the UEFI the CPU thereby acquires location information of a boot manager written to a Non-Volatile RAM (NVRAM) when the OS boots. By executing the UEFI expanded in the ROM the CPU thereby loads, into the memory, the boot manager stored in an auxiliary storage device in accordance with the location information, and shifts control. By executing the boot manager the CPU thereby loads an OS loader into the memory, and proceeds to processing. Subsequently, by executing the OS loader the CPU thereby boots up the OS.

In the booting up performed by the UEFI, information in the NVRAM stored in the ROM is referred to, the boot manager is loaded into the memory (RAM), and then processing proceeds. Because there is no MBR, checking whether a file involved when the OS is loaded has been tampered with is desired to be performed in order to safely boot up the OS. However, because data in the NVRAM is not protected, the contents of the NVRAM also has to be checked. When information in the NVRAM used to boot up of the OS is tampered with by a malicious program, such as virus software, a tampered boot manager other than a normal boot manager may be readily executed. That is, because the tampered boot manager is executed before security software operates, a significant problem, such as incorporation of virus software or deletion of an important file, occurs. However, the user may not be able to notice the tampering because the user may not be able to check what state the boot information of the OS is in. In addition, when information used to boot is deleted, the UEFI is not able to load the boot manager and the OS is not able to be loaded.

As related art, Japanese Laid-open Patent Publication No. 10-333902 is known.

SUMMARY

According to an aspect of the invention, an information processing apparatus includes: a first storage configured to store an operating system program; a second storage including a boot program storage area that stores a boot program that boots up the operating system program, a first area that stores first path information indicating a location of the operating system program in the first storage, and a second area that is set to be accessible by the boot program and stores second path information indicating a location of an operating system program previously booted up; and a processor coupled to the first storage and the second storage, and configured to: write the first path information, which is stored in the first area and used to boot up the operating system program, into the second area, upon first booting-up, compare, using the boot program, the first path information stored in the first area and the second path information stored in the second area upon second booting-up subsequent to the first booting-up, determine whether the operating system program indicated by the first path information is to be booted up based on a result of the comparing, and write the second path information into the first area when the operating system program indicated by the first path information is not to be booted up.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of OS boot information data.

FIG. 6 is a flowchart illustrating a boot process of the information processing apparatus.

FIG. 7 is a flowchart illustrating a process of protecting OS boot information of the information processing apparatus.

DESCRIPTION OF EMBODIMENT

An information processing apparatus according to the embodiment will be described below.

Figure 1:
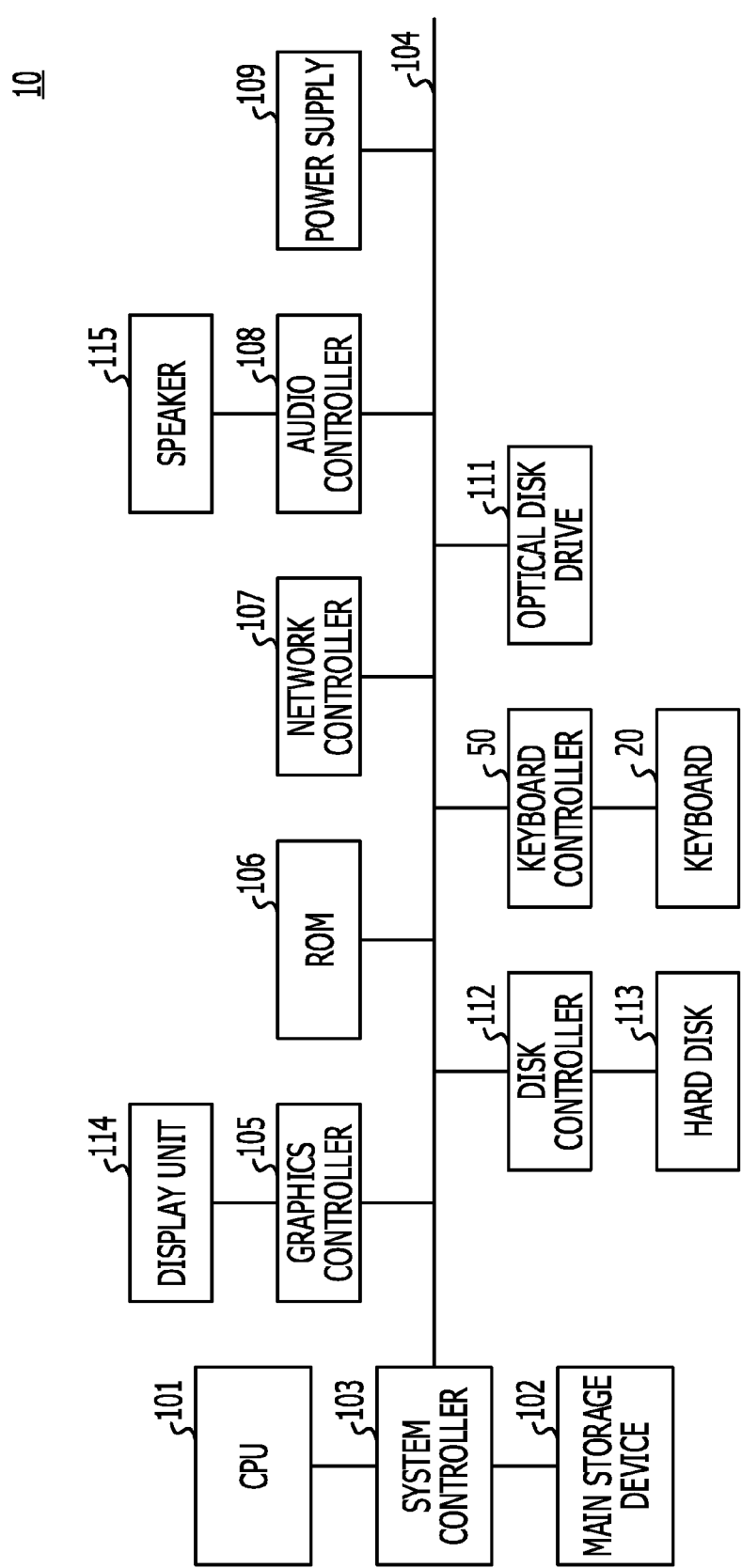
FIG. 1 briefly illustrates an example of a hardware configuration of an information processing apparatus.

FIG. 1 is a block diagram simply illustrating an example of a hardware configuration of an information processing apparatus 10 according to the embodiment. The entire information processing apparatus 10 is controlled by a central processing unit (CPU) 101.

A system controller 103 is connected to the CPU 101 and a main storage device 102. The system controller 103 controls data transfer between the CPU 101 and the main storage device 102, and data transfer between the CPU 101 and a bus 104. In addition, a graphics controller 105, a read-only memory (ROM) 106, a network controller 107, an audio controller 108, a power supply 109, an optical disk drive 111, a keyboard controller 50, and a disk controller 112 are connected to the system controller 103 via the bus 104.

At least part of a program of an operating system (OS) or an application program that is executed by the CPU 101 is temporarily stored in the main storage device 102. In addition, various types of data involved in processing performed by the CPU 101 are stored in the main storage device 102. As the main storage device 102, for example, a random access memory (RAM) is used.

A hard disk 113 is connected to the disk controller 112. Programs of the OS and an application, and various types of data are stored in the hard disk 113. In the ROM 106, for example, a Unified Extensible Firmware Interface (UEFI) program is stored.

A display unit 114, such as a liquid crystal monitor (LCD), is connected to the graphics controller 105, and an image is displayed on a screen of the display unit 114 in accordance with a command from the CPU 101.

The network controller 107 is connected to a network and performs transmission and reception of data between the CPU 101 or the hard disk 113 and another information processing apparatus across the network.

A keyboard 20 is connected to the keyboard controller 50, and a signal sent from the keyboard 20 is transmitted to the CPU 101 via the bus 104.

A speaker 115 is connected to the audio controller 108, and sound is generated from the speaker 115 in accordance with a command from the CPU 101.

The power supply 109 supplies power to each piece of hardware in the information processing apparatus 10 via a power line, which is not illustrated.

Processing functions of the information processing apparatus 10 may be implemented by using such hardware.

Figure 2:
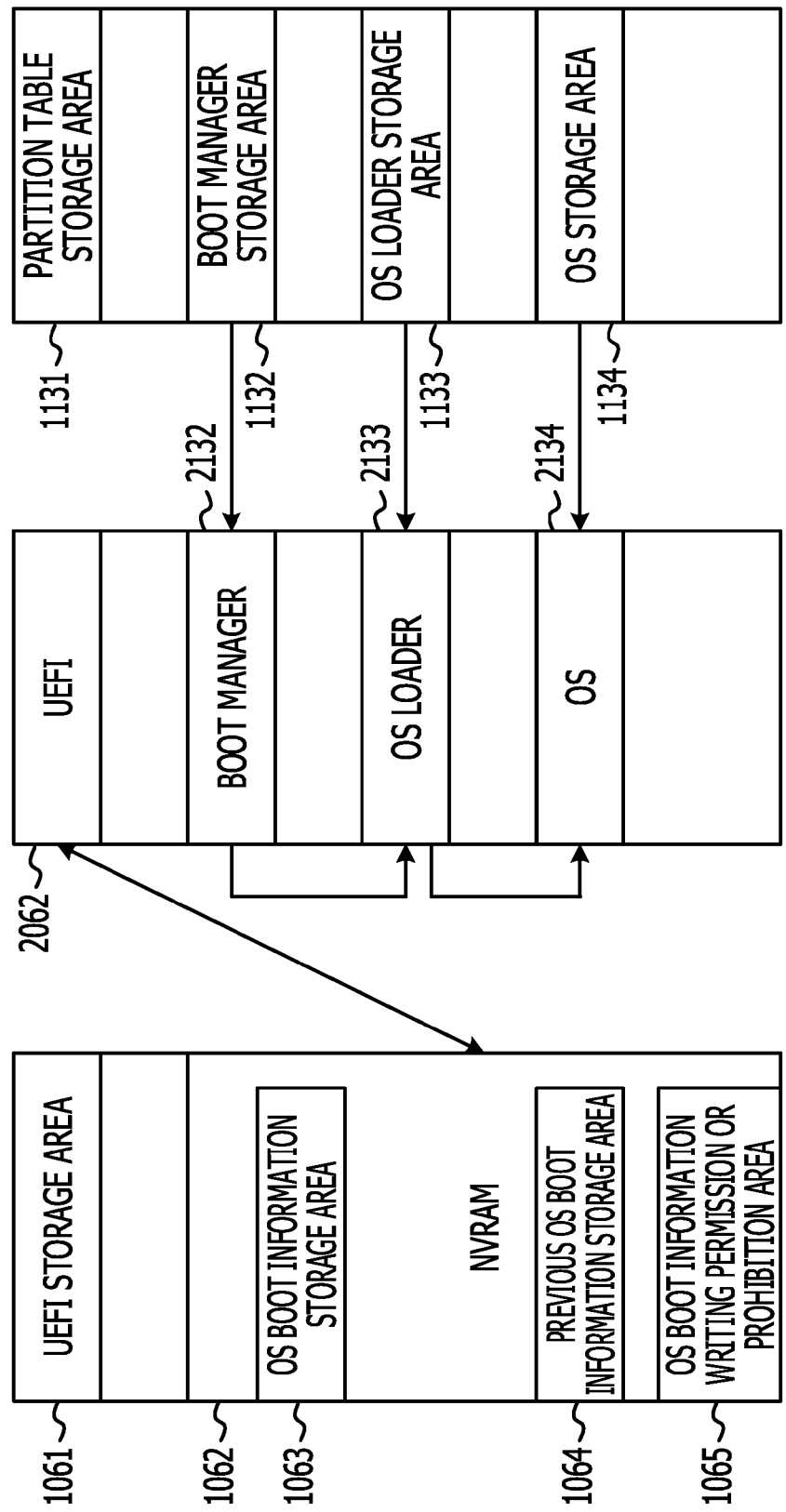
FIG. 2 illustrates an example of the configuration of a ROM, a main storage device, and a hard disk.

FIG. 2 is a block diagram briefly illustrating an example of the configuration of the ROM 106, the main storage device 102, and the hard disk 113 according to the embodiment.

The ROM 106 has a UEFI storage area 1061 and an NVRAM 1062. The NVRAM 1062 has an OS boot information storage area 1063, a previous OS boot information storage area 1064, and an OS boot information writing permission or prohibition area 1065.

The UEFI storage area 1061 stores a UEFI 2062. The UEFI 2062 is a group of programs that control a peripheral device, such as a keyboard. The OS boot information storage area 1063 stores, for example, a path name that indicates boot information on the OS. The previous OS boot information storage area 1064 stores, for example, a path name that indicates boot information on an OS that has been previously booted up. The OS boot information writing permission or prohibition area 1065 stores information on whether writing OS boot information is permitted. As for information on whether writing is permitted, with one byte of information, for example, "00" indicates "permission", "01" indicates "prohibition", and "02" indicates "check when booting-up".

The hard disk 113 has a partition table storage area 1131, a boot manager storage area 1132, an OS loader storage area 1133, and an OS storage area 1134.

The partition table storage area 1131 stores a partition table. The partition table has a boot identifier indicating whether the partition is an active partition or not, location information indicating the starting location and ending location of a partition, an ID of the partition, and a system ID indicating the file system type. The boot manager storage area 1132 stores a boot manager 2132. The boot manager 2132 is a program that displays a menu of a plurality of OSs and discriminates between boots of the OSs in accordance with an instruction from the user. The OS loader storage area 1133 stores an OS loader 2133. The OS loader 2133 is a program that operates directly after the information processing apparatus 10 starts up and reads an OS 2134 from the hard disk 113 and boots up the OS 2134. The OS storage area 1134 stores the OS 2134. The OS 2134 is a program that provides a common basic function used by many pieces of application software and controls the information processing apparatus 10. Examples of the basic function include an input/output function, such as input by keyboard or display of an image, and management of a hard disk and memory.

Here, the previous OS boot information storage area 1064 and the OS boot information writing permission or prohibition area 1065 are areas accessible from the UEFI 2062. A runtime service of the UEFI 2062 will be described later.

FIG. 3 illustrates an example of OS boot information data. The OS boot information has a boot menu name 201, a path name 202 of the boot manager 2132, and GUID information 203 of the boot manager 2132. The boot menu name 201 is the name of the OS to be booted up. The path name 202 of the boot manager 2132 indicates information about the location in which the boot manager 2132 for booting up the OS is stored. The GUID information 203 of the boot manager 2132 indicates information on the arrangement of the partition table on the hard disk 113.

Figure 4:
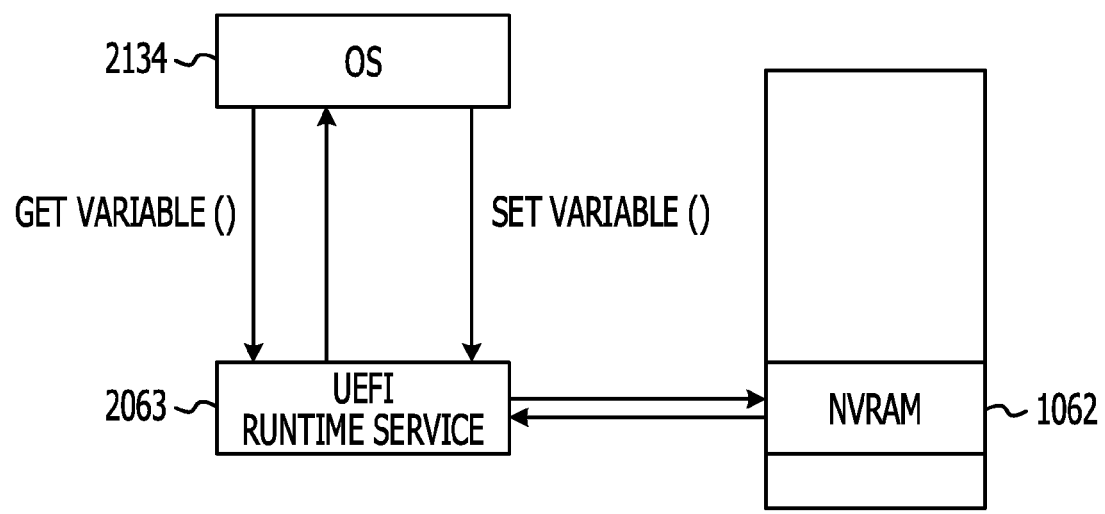
FIG. 4 illustrates reading and writing of data performed by a runtime service of a UEFI.

FIG. 4 illustrates reading and writing of data performed by the runtime service of the UEFI.

The CPU 101 executes the OS 2134 and thereby issues a GetVariable function and a SetVariable function to a UEFI runtime service 2063. The CPU 101 executes the OS 2134 and thereby issues the GetVariable function to the UEFI runtime service 2063, so that, for example, OS boot information may be acquired from the NVRAM 1062. In addition, the CPU 101 executes the OS 2134 and thereby issues the SetVariable function to the UEFI runtime service 2063, so that, for example, newly added boot information may be written into the NVRAM 1062.

Here, the OS boot information storage area 1063 illustrated in FIG. 2 is an area allocated for the runtime service of the UEFI 2062 and is accessible by the CPU 101 using the runtime service of the UEFI 2062. However, the previous OS boot information storage area 1064 and the OS boot information writing permission or prohibition area 1065 which are illustrated in FIG. 2 are areas which are inaccessible by the CPU 101 using the OS. In the embodiment, in the NVRAM 1062, the previous OS boot information storage area 1064 and the OS boot information writing permission or prohibition area 1065 are provided in areas other than the area allocated for the runtime service of the UEFI 2062. In addition, a function enabling access to the previous OS boot information storage area 1064 and the OS boot information writing permission or prohibition area 1065 is provided in the UEFI 2062, thereby enabling the UEFI 2062 to access the previous OS boot information storage area 1064 and the OS boot information writing permission or prohibition area 1065. Here, in one example of the function enabling access to the previous OS boot information storage area 1064 and the OS boot information writing permission or prohibition area 1065, address information of the previous OS boot information storage area 1064 and address information of the OS boot information writing permission or prohibition area 1065 may be added to the UEFI 2062. This enables the UEFI 2062 to refer to the address information of the previous OS boot information storage area 1064 and the address information of the OS boot information writing permission or prohibition area 1065, so that the UEFI 2062 may access the previous OS boot information storage area 1064 and the OS boot information writing permission or prohibition area 1065. Furthermore, the previous OS boot information storage area 1064 and the OS boot information writing permission or prohibition area 1065 are inaccessible from anything other than the UEFI 2062. In order to disable access from anything other than the UEFI 2062, in one example, the UEFI 2062 may omit notifying an OS of the address information of the previous OS boot information storage area 1064 and the address information of the OS boot information writing permission or prohibition area 1065 when booting-up the OS. This disables the OS from referring to the address information of the address information of the previous OS boot information storage area 1064 and the address information of the OS boot information writing permission or prohibition area 1065, so that the OS may not be able to access the previous OS boot information storage area 1064 and the OS boot information writing permission or prohibition area 1065.

Figure 5:
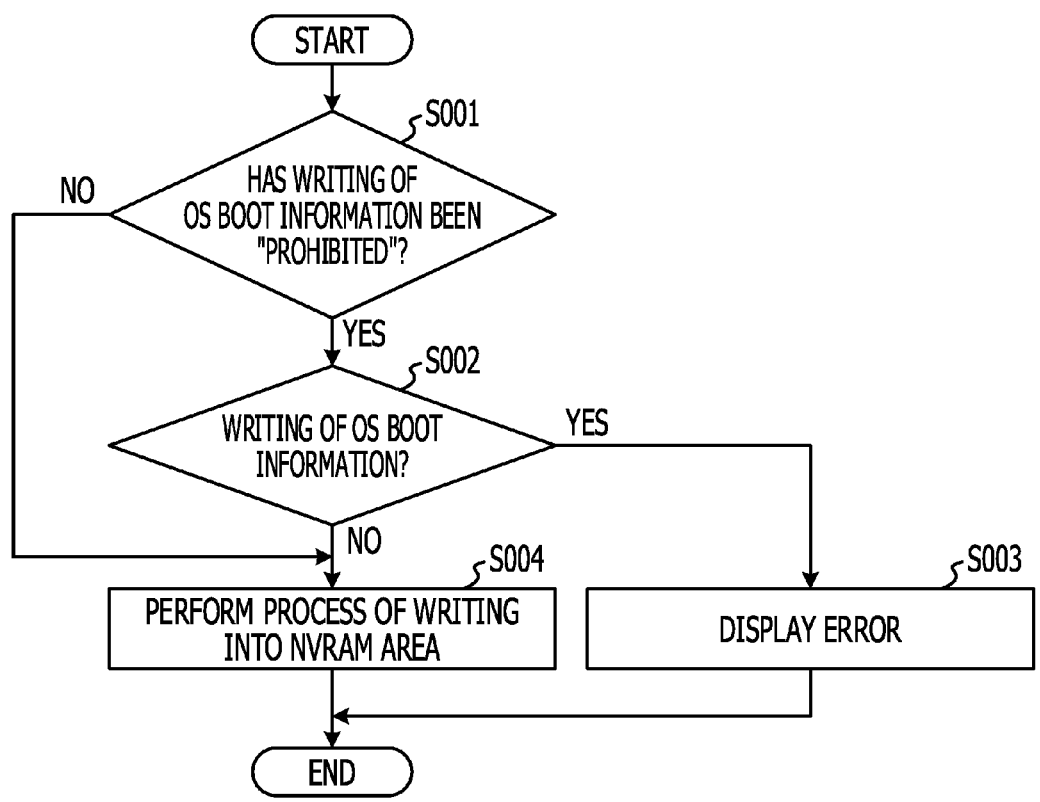
FIG. 5 is a flowchart illustrating a process of changing OS boot information.

The runtime service of the UEFI 2062 that changes the OS boot information stored in the OS boot information storage area 1063 of the NVRAM 1062 will be described below by using FIG. 5.

In step S001, when the CPU 101 executes the UEFI 2062 and thereby receives a command, the CPU 101 refers to the OS boot information writing permission or prohibition area 1065 and determines whether writing of OS boot information has been prohibited. If the writing of OS boot information has been prohibited, the process proceeds to step S002. However, if the writing of OS boot information has not been prohibited, the process proceeds to step S004.

In step S002, the CPU 101 executes the UEFI 2062 and thereby determines whether the received command is to write OS boot information. When the received command is to write OS boot information, the process proceeds to step S003. However, when the received command is not to write OS boot information, the process proceeds to step S004.

In step S003, the CPU 101 executes the UEFI 2062 and thereby displays an error on the display unit 114 via the graphics controller 105. The process ends.

In step S004, the CPU 101 executes the UEFI 2062 and thereby writes new OS boot information into the OS boot information storage area 1063. The process ends.

In the UEFI 2062, OS boot information is stored in the NVRAM 1062 on the ROM 106. As described above, the OS boot information stored in the NVRAM 1062 may be rewritten by the runtime service. For example, when a plurality of OSs are switched between and booted up in the same apparatus, if the respective pieces of OS boot information have been written, the OSs may be switched and then booted up.

A boot process of the information processing apparatus 10 according to the embodiment will be described below by using FIG. 6.

In step S101, the CPU 101 detects, via the system controller 103, that the power supply 109 has been turned on. The process proceeds to step S102.

In step S102, the CPU 101 executes the UEFI 2062 that is on the ROM 106. The UEFI 2062 initializes a register of the CPU 101, and so forth. The process proceeds to step S103.

In step S103, the CPU 101 executes the UEFI 2062 that is on the main storage device 102. The CPU 101 executes the UEFI 2062 and thereby initializes a memory controller and a USB. The process proceeds to step S104.

In step S104, the CPU 101 executes the UEFI 2062 and thereby performs a process of protecting OS boot information. The process proceeds to step S105. The process of protecting OS boot information will be described later in detail.

In step S105, the CPU 101 executes the UEFI 2062, thereby refers to the NVRAM 1062, and acquires location information of the boot manager 2132. The process proceeds to step S106.

In step S106, the CPU 101 executes the UEFI 2062, thereby reads the boot manager 2132 from the hard disk 113, loads the boot manager 2132 into the main storage device 102, and shifts control to the boot manager 2132. The process proceeds to step S107.

In step S107, the CPU 101 executes the boot manager 2132, thereby reads the OS loader 2133 from the hard disk 113, loads the OS loader 2133 into the main storage device 102, and shifts control to the OS loader 2133. The process proceeds to step S108.

In step S108, the CPU 101 executes the OS loader 2133, thereby reads the OS 2134 from the hard disk 113, loads the OS 2134 into the main storage device 102, and shifts control to the OS 2134. The process proceeds to step S109.

In step S109, the CPU 101 uses the UEFI 2062 to write the path name of the OS currently booted up into the previous OS boot information storage area 1064. The process ends.

For example, when the user wants to add a new OS to the information processing apparatus 10, when a certain operation for the addition of the new OS is performed via the keyboard 20, the CPU 101 writes the path name of the new OS into the OS boot information storage area 1063.

A process of protecting OS boot information in the embodiment will be described below by using FIG. 7.

In step S201, the CPU 101 executes the UEFI 2062 and thereby refers to the OS boot information writing permission or prohibition area 1065. The process proceeds to step S202.

In step S202, the CPU 101 executes the UEFI 2062 and thereby determines whether writing of OS boot information has been permitted. When the writing of OS boot information has been permitted, the process proceeds to step S203. However, when the writing of OS boot information has not been permitted, the process proceeds to step S204.

In step S203, the CPU 101 executes the UEFI 2062 and thereby stores new OS boot information in the previous OS boot information storage area 1063. The process ends.

In step S204, the CPU 101 executes the UEFI 2062 and thereby determines whether the writing of OS boot information has been prohibited. When the writing of OS boot information has been prohibited, the process ends. However, when the writing of OS boot information has not been prohibited, the process proceeds to step S205.

In step S205, the CPU 101 executes the UEFI 2062 and thereby compares the boot information stored in the OS boot information storage area 1063 with the boot information stored in the previous OS boot information storage area 1064. The process proceeds to step S206.

In step S206, the CPU 101 executes the UEFI 2062 and thereby determines, by using a result of the comparison of the boot information stored in the OS boot information storage area 1063 and the boot information stored in the previous OS boot information storage area 1064, whether the OS boot information has been changed. When the OS boot information has been changed, the process proceeds to step S207. However, when the OS boot information has not been changed, the process ends.

In step S207, the CPU 101 executes the UEFI 2062 and thereby displays on the display unit 114 via the graphics controller 105 a message inquiring whether changing of the OS boot information is permitted. The process proceeds to step S208.

In step S208, the CPU 101 executes the UEFI 2062 and thereby determines whether the user, by using the keyboard 20 and via the keyboard controller 50, has selected to give permission to change the OS boot information. When permission to change the OS boot information has been selected, the process proceeds to step S203. However, when permission to change the OS boot information has not been selected, the process proceeds to step S209.

In step S209, the CPU 101 executes the UEFI 2062 and thereby stores the previous OS boot information in the OS boot information storage area 1063. As a result, the user may be warned even if OS boot information is rewritten by a malicious user. In addition, because the rewritten OS boot information may be rewritten with normal OS boot information, the security of the information processing apparatus 10 may be enhanced. The process ends.

The information processing apparatus according to the exemplary embodiment of the present invention is described above; however, the present invention is not limited to the embodiment specifically disclosed and various modifications and changes may be made without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first storage configured to store an operating system program;
a second storage including
a boot program storage area that stores a boot program that boots up the operating system program,
a first area that stores first path information indicating a location of the operating system program in the first storage, and
a second area that is set to be accessible by the boot program and stores second path information indicating a location of an operating system program previously booted up; and
a processor coupled to the first storage and the second storage, and programmed to:
write the first path information, which is stored in the first area and used to boot up the operating system program, into the second area, upon first booting-up,
compare, using the boot program, the first path information stored in the first area and the second path information stored in the second area upon second booting-up subsequent to the first booting-up,
determine whether the operating system program indicated by the first path information is to be booted up based on a result of the comparing, and
write the second path information into the first area when the operating system program indicated by the first path information is not to be booted up.

2. The information processing apparatus according to claim 1, wherein
the processor is further programmed to send notice of whether booting up of the operating system program indicated by the first path information is permitted when the first path information and the second path information do not match in accordance with the result of the comparing.

3. The information processing apparatus according to claim 1, wherein
the second storage includes a flag storage area that stores a flag indicating permission or prohibition to rewrite the first path information stored in the first area, and
the processor is further programmed to determine whether the first path information stored in the first area is to be updated by referring to the flag using the boot program.

4. A control method executed by a controller in an information processing apparatus, the method comprising:
booting up an operating system program stored in a first storage indicated by first path information stored in a first area of a second storage by using a boot program stored in the second storage upon first booting-up;
writing the first path information used for booting up of the operating system program into a second area of the second storage set to be accessible by the boot program;
upon second booting-up subsequent to the first booting-up,
referring to the first path information stored in the first area of the second storage by using the boot program;
referring to second path information stored in the second area;
comparing the referred first path information and the referred second path information;
determining whether the operating system program indicated by the referred first path information is to be booted up based on a result of the comparing; and
writing the referred second path information into the first area when the operating system program is not to be booted up in accordance with the determining.

5. The control method according to claim 4, further comprising:
sending notice of whether booting up of the operating system program indicated by the first path information is permitted when the first path information and the second path information do not match in accordance with the result of the comparing.

6. The control method according to claim 4, wherein
the second storage includes a flag storage area that stores a flag indicating permission or prohibition to rewrite the first path information stored in the first area,
the control method further comprising:
determining whether the first path information stored in the first area is to be updated by referring to the flag using the boot program.

* * * * *